May 11, 1926.  1,584,039
F. SCHAEFER
BRAKE HANGER
Filed March 10, 1925
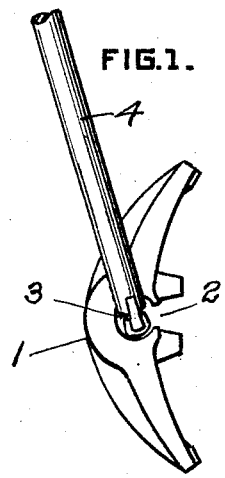
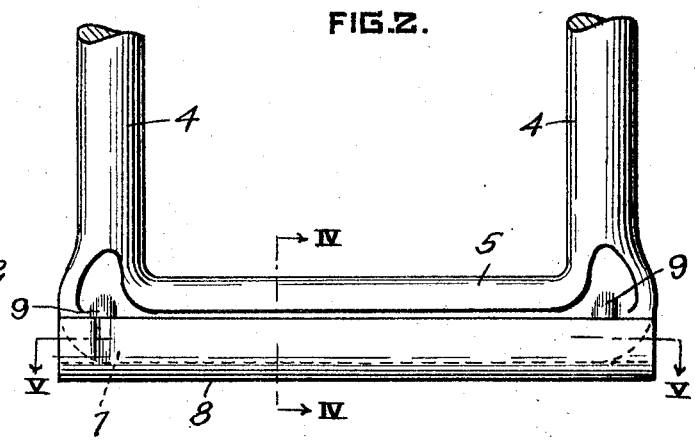
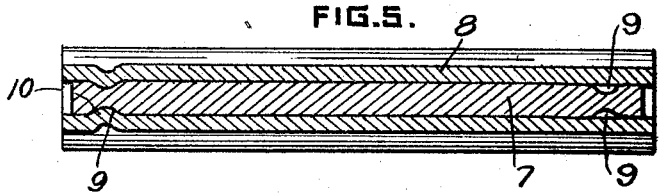
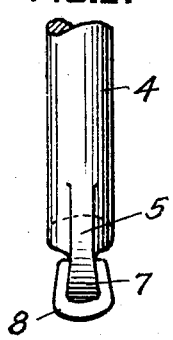
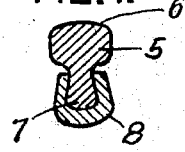
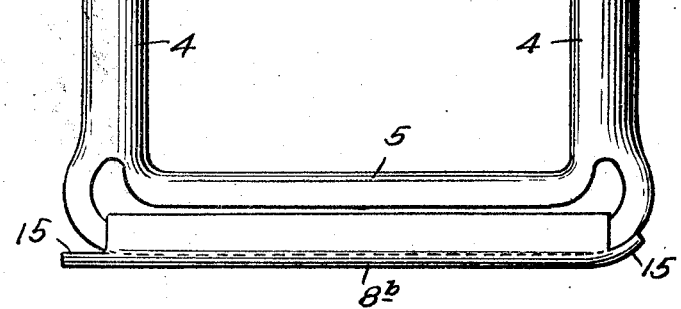
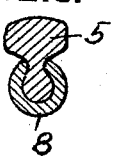
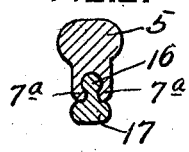
WITNESSES
INVENTOR
Frederic Schaefer,
by Winter Brown & Critchlow
his attorneys Patented May 11, 1926.

1,584,039

UNITED STATES PATENT OFFICE.

FREDERIC SCHAEFER, OF PITTSBURGH, PENNSYLVANIA.

BRAKE HANGER.

Application filed March 10, 1925. Serial No. 14,396.

The invention relates to brake hangers for supporting brake beams for railway car trucks.

As now constructed, many brake beams are provided with horizontally-disposed slots which are open at their outer ends to receive brake hanger yokes that are of elongate cross-section, and which are enlarged at their inner ends to form a bearing for the yokes and to lock the yokes against removal from the slots when the brake hangers are in the positions which they normally occupy. As an example of brake hangers having yokes which are elongate in cross-section, and of the manner in which they are attached to brake beams, reference may be made to my U. S. Patent No. 1,470,121. Briefly, to attach such a brake hanger to a brake beam the hanger is turned to, or towards, a horizontal position so that the long dimension of the yoke lies in the general plane of the outer portion of the slot, and the yoke is then moved through the slot to its inner enlarged portion. Thereafter the brake hanger is turned upwardly so that the long dimension of its cross-section extends transversely of the outer end of the slot, thus locking the brake hanger to the beam.

Some car trucks are so constructed that brake hangers may not be turned far enough towards a horizontal position to permit their yokes to enter the contracted outer portions of brake beam slots such as described. In such cases it becomes necessary to disconnect the brake beams from the brake rigging in order to attach brake hangers to or remove them from the beams, a matter which is laborious and requires considerable time.

The object of this invention is to provide a brake hanger having a yoke formed integrally with it which may enter yoke-receiving slots of the character explained regardless of the position of the brake hanger, and which may thereafter be provided with an element which locks the yoke against removal from the slot and which forms a part of the yoke bearing.

The invention is illustrated in the accompanying drawings of which Fig. 1 is an end view of a brake beam suspended by a brake hanger; Fig. 2 a face view of a portion of a brake hanger illustrating one embodiment of the invention; Fig. 3 a side view of the brake hanger shown in Fig. 2; Fig. 4 a transverse sectional view of the yoke taken on the line IV—IV, Fig. 2; Fig. 5 a longitudinal sectional view of a portion of the yoke taken on the line V—V, Fig. 2; Fig. 6 a view similar to Fig. 5 showing a modification of construction; Fig. 7 a view similar to Fig. 2 showing a further modification of construction; and Figs. 8 and 9 transverse sectional views of yokes similar to Fig. 4 showing still further modifications of construction.

Having reference to Fig. 1, a brake beam 1 is shown as being provided with a horizontally disposed slot having a contracted outer portion 2, which is opened at its outer end, and an enlarged portion 3 which forms a bearing for the lower yoke of a brake hanger having side arms 4 and a horizontally disposed yoke 5 formed integrally with the side arms. As previously explained, brake beams are now frequently provided with such slots to receive brake hanger yokes of elongate cross-section, the brake hanger being turned to, or substantially to, a horizontal position to permit the yoke to enter the contracted portion 2 of the slot, and being thereafterwards turned upwardly to lock the yoke against removal.

In the practice of this invention the portion of the yoke which is formed integrally with the side arms of the brake hanger is so formed that it may enter the contracted portion of the slot in all positions of the brake hanger, which includes the position which the brake hanger occupies in service. After the yoke has entered the slot and lies in its inner enlarged portion, a key is attached to the yoke in such a manner that it may readily be removed when desired. The key is preferably in the form of a bearing element adapted to be slid longitudinally upon the yoke from its end to its operative position.

Having reference to the embodiment of the invention illustrated in Figs. 2-5, the yoke 5 is preferably constructed to form a main bearing 6 on its inner side, and is provided with an outwardly projecting rib 7 adapted to receive a key in the form of a sleeve 8 which forms a bearing on the outside of the yoke and so increases the depth of the yoke that the yoke becomes locked against removal through the contracted portion 2 of the receiving slot during such time as the brake hanger is in the position which it normally occupies in service. More specifically the depth of the yoke 5, that is to say the distance from its inner bearing surface 6 to the outer edge of rib 7, is slightly less than the vertical width of the contracted portion 2 of the slot, and when sleeve 8 is applied to rib 7 the depth of the composite yoke is greater than the width of the contracted portion of the slot and slightly less than the diameter of its enlarged or bearing portion 3.

For attaching sleeve 8 to yoke 5, these two elements are preferably provided with interlocking detents which engage each other when the sleeve is fully applied to the yoke. As shown in Fig. 5, the outer face of rib 7 may be provided with depressions 9 adapted to receive inwardly extending projections 10 formed on the side of the sleeve. When this form of attachment is used the metal of which the sleeve is made is sufficiently resilient to permit the sleeve to be driven longitudinally of rib 7 and to cause the projections 10 of the sleeve to snap into the recesses 9 when they are in registration with each other. If sleeve 8 is applied to the brake hanger from the left to the right as viewed in Fig. 2, the cooperating detents 9 and 10 may conveniently be positioned near the left end of the sleeve and rib 7, thus eliminating the resistance of projections 10 to the application of the sleeve during the major portion of its sliding movement upon rib 7. That the sleeve may similarly be driven from either end of the hanger, rib 7 is preferably provided with depressions 9 at each end of the yoke, as seen in Fig. 5.

The cooperating detents of the yoke and sleeve may be the reverse of that shown in Fig. 5. This is illustrated in Fig. 6 which shows a sleeve 8ª as being provided interiorly with recesses 11, and rib 7 as being provided exteriorly with projections 12. In this instance the cooperating detents are preferably placed at or near the other end of the sleeve and rib to minimize the extent of resistance of projections 12 to the sliding of a sleeve upon the rib.

In place of forming cooperating detents on the sleeve and yoke which rely for their effectiveness on the resiliency of the sleeve, the sleeve may be formed of malleable metal and be provided with tongues which may be bent to engage the brake hanger yoke after the sleeve is applied to it. This modification of construction is illustrated in Fig. 7 which shows a sleeve 8ᵇ provided at its ends with tongues 15 adapted to be hammered into engagement with the opposite ends of a yoke. The tongue 15 at the right end of the yoke is shown as being bent into yoke-engaging position, and that at the left end as being in the position which it occupies before being bent upwardly. To remove sleeve 8ᵇ it is only necessary to bend one of the tongues downwardly and then drive the sleeve from its engagement with the yoke.

In all forms of the invention the rib of the yoke may be variously shaped to receive a bearing or locking sleeve or key. While the sides of the rib preferably flare, as shown in Fig. 4, the rib may be rounded, as shown in Fig. 8. Furthermore, the outer face of the yoke may, as shown in Fig. 9, be provided with a pair of ribs 7ª forming a channel between them adapted to receive a head 16 of the locking key having an outer bearing face 17.

While the invention has been illustrated in its applicability to the attachment of the lower yokes of brake hangers to brake beams, it is also applicable to the upper yokes of brake hangers when railway car trucks are provided with brake hanger supports having yoke-receiving slots the same as the slot 2, 3 of brake beam 1. Such brake hanger supports are illustrated in my pending patent application Serial No. 756,925, filed December 19, 1924.

It will be understood of all forms of the invention that the yoke of a brake hanger may readily be caused to enter the contracted portion of a yoke-receiving slot in all positions of the brake hanger; that it may thereafter be held against removal by attaching a locking key to the yoke; and that when it is desired to detach a brake hanger it is only necessary to remove the locking key. The use of such brake hangers makes it unnecessary to disconnect the brake beams from brake riggings in order to attach a brake hanger yoke to its receiving member where there is insufficient room to turn the brake hanger to a horizontal position.

According to the provisions of the patent statutes, I have explained the principle and operation of my invention, and have illustrated and described several embodiments of it. However, I desire to have it understood that, within the scope of the appended claims, the invention may be practiced by other forms of construction than those particularly illustrated and described.

I claim as my invention:

1. In a railway car truck, the combination with a brake hanger receiving member provided with a horizontally disposed slot open at its outer end to receive a yoke of a brake hanger and enlarged at its inner end to form a bearing for the yoke; of a brake hanger having a yoke capable of entering said slot at any angular position of the hanger, and a key attachable to said yoke while the yoke is in the enlarged portion of said slot and thereafter effective to prevent the removal of the yoke from the slot while the brake hanger is in its operative position.

2. In a railway car truck, the combination with a brake beam provided with a horizontally disposed slot open at its outer end to receive the lower yoke of a brake hanger and enlarged at its inner end to form a bearing for the yoke; of a brake hanger having a yoke arranged in the enlarged portion of said slot and provided on its inner side with a bearing, the largest cross-sectional dimension of the yoke being less than the minimum width of said slot whereby the yoke may enter the slot at all angular positions of the brake hanger, and an exteriorly facing bearing element removably attached to said yoke and effective to prevent the removal of the yoke from the slot while the brake hanger is in its operative position, said element being attachable to said yoke while the yoke is in the enlarged portion of said slot.

3. A brake hanger having side arms and a yoke formed integrally with them, said yoke being provided on its inner side with a bearing, and a bearing sleeve attached to the outer side of the yoke and movable longitudinally of the yoke for attachment to and removal from the yoke.

4. A brake hanger having side arms and a yoke formed integrally with them, said yoke being provided on its inner side with a bearing and provided on its outer side with a rib, and a bearing sleeve engaging said rib, said rib and sleeve being provided with interlocking detents for normally holding the sleeve upon the yoke, said sleeve being movable longitudinally of the yoke for attachment to and removal from the yoke.

5. A brake hanger having side arms and a yoke formed integrally with them, said yoke being provided on its inner side with a bearing and provided on its outer side with a rib, and a bearing sleeve formed of resilient material engaging the side of said rib, said rib and sleeve being provided with interlocking detents for normally holding the sleeve upon the yoke, said sleeve being movable longitudinally of the yoke for attachment to and removal from the yoke.

6. The combination with a brake beam provided with an opening for receiving a brake hanger, a brake hanger having side arms and a bearing yoke formed integrally with them, said yoke being arranged in said brake beam opening, and a sleeve attached to said hanger and locking said yoke in said opening.

In testimony whereof, I sign my name.

FREDERIC SCHAEFER.